Patented Dec. 6, 1949

2,490,633

UNITED STATES PATENT OFFICE 2,490,633

PURIFICATION OF AMMONIUM BERYLLIUM FLUORIDE

Henry C. Kawecki, Fleetwood, Pa., assignor to The Beryllium Corporation, Reading, Pa., a corporation of Delaware No Drawing. Application January 21, 1949, Serial No. 72,097

10 Claims. (Cl. 23—88)

1

This invention relates to the production of relatively pure beryllium compounds and, more particularly, to the purification of ammonium beryllium fluoride from which other beryllium compounds and beryllium metal of high purity may be obtained.

In the application of myself and Gordon F. Simons, Serial No. 44,997, filed August 18, 1948, there is described and claimed a method which we devised for the recovery of beryllium from its ores in the form of relatively pure ammonium beryllium fluoride. The method described in said application comprises heating beryllium ore with a double fluoride of an alkali metal and either iron or silicon to a temperature sufficiently high to effect decomposition of the ore with the resulting production of sodium beryllium fluoride, disintegrating the resulting product in the presence of added water, adding ammonium fluosilicate to the disintegrated product, and separating therefrom the resulting aqueous phase comprising a solution of ammonium beryllium fluoride. The ammonium beryllium fluoride, which is also known as ammonium fluoberyllate, can be recovered from its solution by any appropriate means such as crystallization.

Although the ammonium beryllium fluoride produced as described hereinbefore is sufficiently pure to constitute an ideal starting material for the production of other beryllium compounds, such as beryllium oxide, as well as metallic beryllium, the solid ammonium beryllium fluoride so produced contains a small amount of lithium as an impurity. This lithium impurity is not objectionable for most commercial purposes but must be removed in order to meet the purity requirements for certain needs. The lithium is generally present in the solid ammonuium beryllium fluoride to the extent of about 0.1–0.3% expressed as lithium (Li), and has resisted all attempts to effect its removal. Competent investigators have endeavored to remove the lithium impurity from solid ammonium beryllium fluoride by all conceivable means including the use of inorganic and organic precipitating agents, inorganic and organic solvents, and recrystallization procedures of wide variety. The lithium appears to be present in the ammonium beryllium fluoride in the form of some compound, the composition of which has not yet been definitely ascertained, which has chemical and physical properties so resembling those of the ammonium beryllium fluoride as to present a tantalizing problem in the separation of one from the other.

I have now discovered that either the physical

2 or chemical characteristics, or possibly both, of the lithium impurity present in ammonium beryllium fluoride may be altered by a simple treatment which makes their separation possible. Although repeated dissolution and crystallization of the ammonium beryllium fluoride has no effect upon the stubborn presence of the highly soluble lithium impurity, even when the crystalline ammonium beryllium fluoride is thoroughly air dried or warmed somewhat to remove water physically associated with the crystals, I have discovered wholly unexpectedly that if the solid ammonium beryllium fluoride containing the lithium impurity is heated to a temperature of at least 100° C. some physical or chemical change, or both, occurs which lowers the water-solubility of the lithium impurity without appreciably altering the water-solubility of the ammonium beryllium fluoride. The resulting difference in the water-solubility between the lithium impurity and the ammonium beryllium fluoride is such that in water at a temperature not substantially in excess of about 30° C. the ammonium beryllium fluoride exhibits its normal ready solubility whereas the lithium impurity appears to be substantially insoluble. It is thus possible to remove the lithium impurity simply by separating the ammonium beryllium fluoride solution from the lithium-containing insoluble residue.

Accordingly, the method of purifying solid ammonium beryllium fluoride in accordance with my present invention comprises heating the solid ammonium beryllium fluoride containing the lithium impurity to a temperature of at least 100° C. but not substantially above its temperature of decomposition, admixing the resulting product with water after it has cooled, and separating the lithium-containing impurity in the form of a residue insoluble in the resulting ammonium beryllium fluoride solution at a temperature not substantially in excess of 30° C. Substantially pure ammonium beryllium fluoride, containing at most only a trace of lithium as an impurity, can be recovered from the resulting solution by any appropriate means such as crystallization.

The essential prerequisite of the heating operation which I have found to exhibit such a pronounced effect upon the water solubility of the lithium-containing impurity in ammonium beryllium fluoride appears to be primarily one of attaining the specified temperature and not of maintaining the material at this temperature for any critical period of time. I have found that the lithium impurity can be rendered substantially insoluble in water at temperatures not appreciably in excess of 30° C. merely by raising the temperature of the ammonium beryllium fluoride containing the lithium impurity to a temperature of at least 100° C. Thus, if the ammonium beryllium fluoride is distributed in a shallow layer exposed to a heated atmosphere of about 100° C., the temperature of the ammonium beryllium fluoride can be raised to the temperature of the surrounding atmosphere in a matter of minutes and the resulting insolubility of the lithium impurity will be attained in this period of time. There appears to be little if any advantage in prolonging the heating period beyond the point at which the entire mass of ammonium beryllium fluoride has been raised to the desired temperature. On the other hand, where the ammonium beryllium fluoride is heated in a more massive form, a period of one or several hours may be required in order to bring the entire mass up to the critical temperature. In order to bring such massive quantities of ammonium beryllium fluoride up to the desired minimum temperature, it is advantageous to heat the mass in an atmosphere maintained at a considerably higher temperature. Under such conditions, a portion of the mass of ammonium beryllium fluoride will be heated to a temperature considerably above 100° C., but the attainment of such an elevated temperature appears to have little if any further effect upon the water solubility of the lithium impurity. The only limitation on the temperature to which the ammonium beryllium fluoride should be heated in accordance with the invention is that this temperature should not exceed the decomposition temperature of the ammonium beryllium fluoride. Decomposition of ammonium beryllium fluoride takes place at an appreciable rate at temperatures of about 300° C., and for this reason I prefer to heat the ammonium beryllium fluoride containing the lithium impurity to a temperature of at least 100° C. but not substantially above about 250° C. Regardless of the temperature of the heating atmosphere, the only requirement for the length of the heating period is that it be sufficient to raise substantially all of the ammonium beryllium fluoride in the mass being heated to a temperature of at least 100° C., and preferably to a temperature somewhat above 100° C.

When the ammonium beryllium fluoride and its lithium-containing impurity have been heated to a temperature of at least 100° C., the lithium-containing impurity is substantially insoluble in water at a temperature not substantially in excess of 30° C. At any water temperature ranging from about 30° C. down to the freezing point, the solubility of the lithium impurity or its solubility rate, or both, is such that only a minute amount of the lithium goes into solution with the ammonium beryllium fluoride. When dissolution of the heated ammonium beryllium fluoride containing the lithium impurity is effected within any reasonable period of time, there appears to be very little difference, if any, in the extent of removal of the lithium impurity by using any lower specific temperature below the specified upper limit of about 30° C. Thus, substantially the same degree of separation is effected at a water temperature of about 30° C. as that obtained by adding the heated ammonium beryllium fluoride to a mixture of ice and water. Upon dissolution of the ammonium beryllium fluoride in water in the presence of ice, the temperature of the mixture of the ice and the resulting solution will drop to a minimum of about −7° C., and even at this latter temperature there is very little improvement in the degree of separation compared with that effected at about 30° C. Accordingly, I have found it to be advantageous to use water at room temperature for effecting the desired separation between the water-soluble ammonium beryllium fluoride and the relatively insoluble lithium impurity. It must be understood, however, that the aforementioned upper limit of about 30° C. for effective separation of the lithium impurity from the ammonium beryllium fluoride is not a sharply defined limit. However, it can be stated with certainty that at a temperature of 40° C. the lithium impurity is somewhat soluble in the water and the resulting separation is unsatisfactory. At a temperature of 50° C., the solubility of the lithium impurity is such that the extent of separation of the ammonium beryllium fluoride and its lithium impurity is virtually negligible for all practical purposes.

The composition of the lithium-containing impurity present in ammonium beryllium fluoride either before or after the heat treatment is unknown to me at present. It is possible that the lithium is present in the ammonium beryllium fluoride before the heat treatment in the form of lithium beryllium fluoride having the established formula of $Li_2BeF_4 \cdot H_2O$. It is also possible that if the lithium is present initially in this form, the heating operation may remove the water of crystallization from the lithium compound to produce the corresponding anhydrous product which may have a lower solubility or lower rate of solubility than that of the hydrated product. It is also possible, although less probable, that if the lithium is present in the form of hydrated lithium beryllium fluoride the heating operation may transform the compound to a double salt such as $2LiF \cdot BeF_2$ in which the lithium fluoride has a relatively low water-solubility. It must be emphasized, however, that the method of my present invention is in no way limited to any theoretical consideration regarding the chemical form of the lithium impurity either before or after the heating treatment and is not limited to any theory regarding the nature of the chemical or physical change, or possibly both, which appears to take place in the lithium impurity during the course of the heating treatment. Chemical analysis of the ammonium beryllium fluoride before the heat treatment shows that it contains a small fraction of 1% of lithium as an impurity, and spectrographic analysis of the water-insoluble residue obtained by admixing the heated ammonium beryllium fluoride in water at the aforementioned temperature shows that the residue is composed largely of lithium together with considerably smaller amounts of calcium, magnesium and other elements.

The residue obtained when the heated ammonium beryllium fluoride product is admixed with water as described hereinbefore can be separated from the ammonium beryllium fluoride solution by any suitable means such as decantation or filtration. The relatively small amount of the residue compared to the large volume of the ammonium beryllium fluoride solution eliminates any necessity for washing the residue when it is separated by filtration.

The simplicity and effectiveness of the method of the present invention for removing lithium as an impurity contained in ammonium beryllium fluoride are illustrated by the following specific procedure. The ammonium beryllium fluoride used in this treatment comprised moist crystals thereof obtained by crystallization from an ammonium beryllium fluoride solution produced as described in the aforementioned patent application. A mass comprising 290 parts (on the dry basis) of this crystalline ammonium beryllium fluoride containing about 0.2% lithium (expressed as Li) as an impurity, was heated in the form of a shallow layer for about 1 hour in an oven maintained at a temperature of about 200° C. The resulting product, which had caked somewhat during the baking operation, was broken up after it had cooled and was then added to 1000 parts of water at a temperature of 20° C. The ammonium beryllium fluoride went into solution promptly, and a small amount of insoluble material settled to the bottom of the solution. The insoluble material was removed by filtering without washing, and the clear solution of ammonium beryllium fluoride was evaporated to yield crystalline ammonium beryllium fluoride. Chemical analysis of the resulting crystalline product showed that its lithium content was approximately 0.0007% (expressed as Li). For all presently known purposes, this degree of purity is wholly satisfactory. However, if it is desired to further reduce the lithium content of the ammonium beryllium fluoride, the heating, dissolution and recrystallization process may be repeated to effect further purification.

I claim:

1. The method of purifying solid ammonium beryllium fluoride to remove lithium-containing impurities therefrom which comprises heating the solid ammonium beryllium fluoride to a temperature of at least 100° C. but not substantially above its temperature of decomposition, admixing the resulting product with water, and separating the lithium-containing impurity in the form of a residue insoluble in the resulting ammonium beryllium fluoride solution at a temperature not substantially in excess of 30° C.

2. The method of purifying solid ammonium beryllium fluoride to remove lithium-containing impurities therefrom which comprises heating the solid ammonium beryllium fluoride to a temperature of at least 100° C. but not substantially above its temperature of decomposition, admixing the resulting product with water, separating the lithium-containing impurity in the form of a residue insoluble in the resulting ammonium beryllium fluoride solution at a temperature not substantially in excess of 30° C., removing the lithium-containing residue from the ammonium beryllium fluoride solution, and effecting crystallization from said solution of solid ammonium beryllium fluoride substantially free from lithium contamination.

3. The method of purifying ammonium beryllium fluoride to remove lithium present therein as an impurity which comprises heating a mass of solid ammonium beryllium fluoride containing the lithium impurity until the entire mass is raised to a temperature of at least 100° C. and not substantially above about 250° C., admixing the resulting product with water at a temperature not substantially in excess of about 30° C. until the ammonium beryllium fluoride is dissolved, and separating from the ammonium beryllium fluoride solution the resulting insoluble residue comprising the lithium impurity.

4. The method of purifying ammonium beryllium fluoride to remove lithium present therein as an impurity which comprises heating a mass of solid ammonium beryllium fluoride containing the lithium impurity until the entire mass is raised to a temperature of at least 100° C. and not substantially above about 250° C., admixing the resulting product with water at a temperature not substantially in excess of about 30° C. until the ammonium beryllium fluoride is dissolved, separating from the ammonium beryllium fluoride solution the resulting insoluble residue comprising the lithium impurity, and effecting crystallization from said solution of solid ammonium beryllium fluoride substantially free from lithium contamination.

5. The method of purifying solid ammonium beryllium fluoride to remove lithium-containing impurities therefrom which comprises heating the solid ammonium beryllium fluoride at a temperature of about 200° C. for a period of about 1 hour, admixing the resulting product in an amount of water maintained at a temperature of about 20° C. sufficient to effect dissolution of the ammonium beryllium fluoride, and removing from the ammonium beryllium fluoride solution the resulting water-insoluble residue comprising the lithium-containing impurity.

6. In a method of purifying ammonium beryllium fluoride wherein ammonium beryllium fluoride is crystallized from a solution thereof and is redissolved in a solvent therefor to effect a separation between the ammonium beryllium fluoride and lithium-containing impurities present in the crystallized ammonium beryllium fluoride, the improvement which comprises heating the crystalline ammonium beryllium fluoride containing said lithium impurity to a temperature of at least 100° C. and not substantially above its temperature of decomposition prior to the separation of the lithium-containing impurity.

7. The method of purifying solid ammonium beryllium fluoride obtained by crystallization from an aqueous solution thereof and contaminated with a lithium-containing impurity which comprises heating the crystalline ammonium beryllium fluoride to a temperature of at least 100° C. and not substantially above its temperature of decomposition, admixing the resulting product with water, and separating the lithium-containing impurity in the form of a residue insoluble in the resulting ammonium beryllium fluoride solution at a temperature not substantially in excess of 30° C.

8. The method of purifying ammonium beryllium fluoride by recrystallization from an aqueous medium which comprises heating to a temperature of at least 100° C. and not substantially in excess of its temperature of decomposition solid ammonium beryllium fluoride obtained by crystallization from a solution thereof, effecting dissolution of the so treated ammonium beryllium fluoride in water at a temperature not substantially in excess of 30° C., separating from the resulting ammonium beryllium fluoride solution the water-insoluble residue comprising impurities originally present in the solid ammonium beryllium fluoride, and recrystallizing the ammonium beryllium fluoride from said purified solution.

9. In the method of producing ammonium beryllium fluoride which comprises heating beryllium ore with a double fluoride of an alkali metal and a metal of the group consisting of iron and silicon to a temperature sufficiently high to effect decomposition of the ore with the resulting production of sodium beryllium fluoride, disintegrating the sodium beryllium fluoride product in the presence of added water, adding ammonium fluosilicate to the resulting product, separating therefrom the aqueous phase comprising a solution of ammonium beryllium fluoride, and recovering the ammonium beryllium fluoride by crystallization from said solution thereof, the improvement which comprises removing lithium-containing impurities from the ammonium beryllium fluoride by heating the crystallized ammonium beryllium fluoride to a temperature of at least 100° C. and not substantially above about 250° C., admixing the resulting product with water, and separating the lithium-containing impurity in the form of a residue insoluble in the resulting ammonium beryllium fluoride solution at a temperature not substantially in excess of 30° C.

10. The method of purifying solid ammonium beryllium fluoride obtained by crystallization from a solution thereof which comprises reducing the water-solubility of a lithium-containing impurity without appreciably affecting the water-solubility of the ammonium beryllium fluoride in which it is present as an impurity by heating the solid ammonium beryllium fluoride containing said lithium impurity to a temperature of at least 100° C. and not substantially above its decomposition temperature, and then separating the ammonium beryllium fluoride and its lithium-containing impurity through the medium of their different solubilities in water at a temperature not substantially in excess of 30° C.

HENRY C. KAWECKI.

No references cited.